E. S. JOHNSON.
STOCK WATERING DEVICE.
APPLICATION FILED FEB. 25, 1918.
1,287,696.
Patented Dec. 17, 1918.
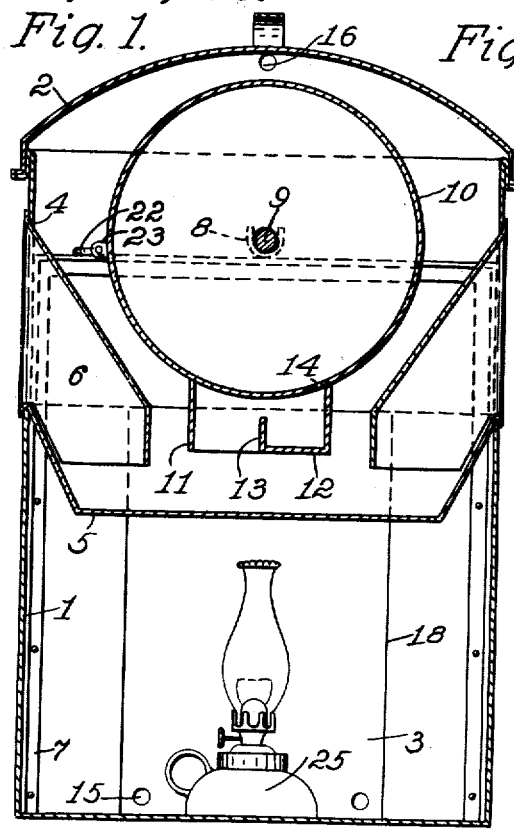
Fig. 1.
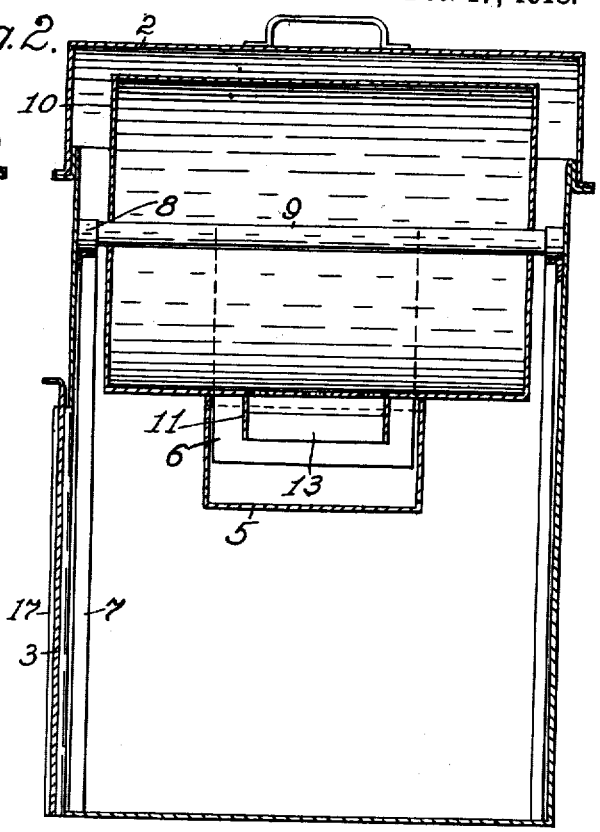
Fig. 2.
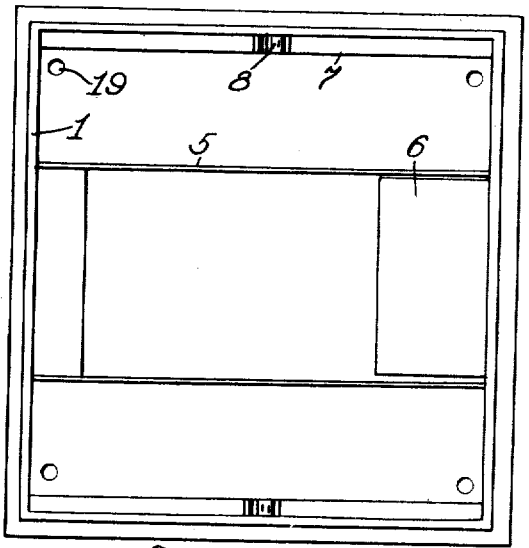
Fig. 3.
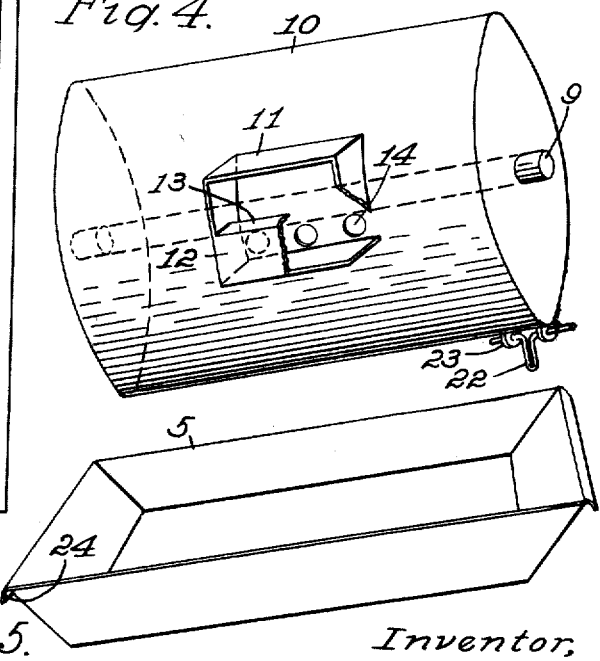
Fig. 4.
Fig. 5.
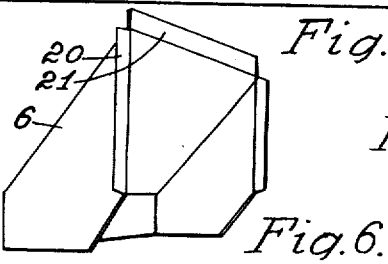
Fig. 6.
Inventor,
E. S. Johnson, by
G. C. Kennedy,
Attorney.

UNITED STATES PATENT OFFICE.

ERNEST S. JOHNSON, OF WEBSTER CITY, IOWA.

STOCK-WATERING DEVICE.

1,287,696.
Specification of Letters Patent.
Patented Dec. 17, 1918.

Application filed February 25, 1918. Serial No. 219,057.

*To all whom it may concern:*

Be it known that I, ERNEST S. JOHNSON, a citizen of the United States of America, and a resident of Webster City, Hamilton county, Iowa, have invented certain new and useful Improvements in Stock-Watering Devices, of which the following is a specification.

My invention relates to improvements in stock watering devices, and the object of my improvement is to furnish a simple, convenient watering tank and holder, provided with removable drinking chambers for a plurality of stock, and arranged interiorly to permit water to be warmed in the tank and the chambers, while permitting cleaning of the chambers at any time.

This object I have accomplished by the means which are hereinafter described and claimed, and which are illustrated in the accompanying drawings, in which: Figure 1 is a vertical transverse medial section of my improved stock watering device; Fig. 2 is a vertical longitudinal medial section of the same; Fig. 3 is a top plan view of the device, with the cover, the tank and one of the chamber-hoods removed; Fig. 4 is a perspective view of the tank, showing its delivery device partially broken away; Fig. 5 is a perspective view of the receptacle, and Fig. 6 is a perspective view of one of the chamber-hoods.

Similar numerals of reference denote corresponding parts throughout the several views.

The numeral 1 denotes a hollow rectangular casing, provided with a removable cover 2 closing its open top. In one end of the casing is a door-opening 18 having at the sides guides 17 to receive the side edges of a slide 3. Both the cover 2 and the slide 3 have ventilating orifices 16 and 15 respectively. A lamp, as indicated in Fig. 1, may be introduced into the casing through said doorway to rest on the bottom plate thereof to warm the contents of the drinking chambers and the supply-tank above. The bottom plate of the casing has orifices 19 to permit drainage.

Referring now to Fig. 1, the numeral 4 denotes a rectangular opening, there being such openings on opposite sides of said casing. A shallow open top pan or receptacle 5 is positioned across the interior of the casing, and has its end edges 24 inverted and fitted removably over the lower edges of said openings to support said receptacle suspensively. Each end of said receptacle, within said casing, is partially inclosed by a chamber-hood 6, of the form shown in said Fig. 6, having its lower rectangular end dipped within the receptacle part way therethrough, each hood having inverted edge parts 20 and 21 which pass through the opening 4 to engage the outer surface of the casing to hold the hood in position. On the inner face of each end-wall of the casing is fixed a supporting-bar 7 on whose middle is a U-shaped bearing 8 to detachably receive the outwardly projected ends or pintles of a cylindrical axis 9 fixed axially through a cylindrical supply-tank or vessel 10. This tank 10 is imperforate except for some orifices 14 placed in alinement longitudinally near together on the lower side of the tank, and which serve as receiving-ports for water when the offices are uppermost, and as delivery-ports for the water when the tank is inverted to the position shown. Surrounding these orifices is a boxing 11 inclosed against the tank at the sides and ends, its bottom partially closed at 12, and having a raised wall 13, which, however, extends only part way toward the tank. When the tank 10 is placed inverted after filling with water in the casing to have its pintles rest in the bearings 8, the boxing 11 extends part way down into the receptacle 5 midway between the hoods 6. At one end of the tank on its cylindrical outer wall, spaced lugs 23 have alined orifices to receive a rod 22, which can be slid along to rest on the ledge of the bar 7 to hold the tank steady.

The inclosed spaces in the receptacle 5 at its ends, serve as drinking chambers for animals, who drink through the openings 4, and the drinking chambers are kept supplied by the tank 10, since the water-level in the receptacle is determined by the delivery of water from the tank by way of the boxing 11 as governed by the limiting wall 13 and the depending lower end of said boxing within said receptacle. It will be seen that all the parts are readily assembled or disassembled for cleaning or repair, the device is compact, can be used by a plurality of animals at once, and the contents of the receptacle and tank kept warm in cold weather, by the lamp within the casing.

Since the tank 10 is rotatable upon its pintles 9, after the slide-pin 22 has been pushed in, and one of the hoods 6 have been removed, the tank may be rocked upwardly in order to place its boxing 11 uppermost, and then water may be introduced into the tank by way of the orifices 14, and when filled, the tank may be rocked reversely to locate the boxing again within the receptacle 5, and the hood 6 replaced, and the tank is then held by sliding the pin 22 outwardly to rest upon the support 7, although, of course, without that, the boxing could not be rotated past the depending hoods 6. Warm air from the lamp 25 circulates through the casing 1, passing upwardly about the tank 10, the openings 15 and 16 in the casing and its cover permitting a proper ventilation.

Having described my invention, what I claim as new, and desire to secure by Letters Patent, is:

1. In a stock watering device, a casing having openings in opposite sides, an open top receptacle positioned across the interior of the casing from one opening to the other, and an inverted vessel having common receiving and delivery ports and having a pendent chamber receiving from said ports and having a channel delivering into said receptacle, including an elevated part of the channel restricting the delivery therefrom, said chamber having part of its outer closure wall removed and having a longitudinal ledge extending as a partial septum across it spaced from the vessel.

2. In a stock watering device, a casing having openings, an open top receptacle positioned within said casing communicating with said openings and having end flanges hung detachably on the lower margins of said openings, hoods partially inclosing end parts of said receptacle removably in communication with both said openings and the receptacle and removable outwardly by way of said openings, and a rotatable tank mounted in said casing above said receptacle, and having a common receiving and delivery port adapted to be used to fill the tank when rotated upwardly, and to deliver its contents into said receptacle when rotated downwardly.

3. In a stock watering device, a casing having openings, an open top receptacle positioned within said casing and communicating with said openings, hoods partially inclosing end parts of said receptacle removable outwardly and being in communication with said openings and said receptacle, and a tank rotatably mounted in the casing above said receptacle having a common receiving and delivery opening, and having a channeled boxing about said opening extending outwardly into said receptacle and between said hoods and limited in side movement by the latter, the hoods being removable to permit the tank to be rotated upwardly to place said boxing upwardly with its channel and the tank-opening in a filling position.

Signed at Webster City, Iowa, this 9th day of Feb., 1918.

ERNEST S. JOHNSON.

Witnesses:
 B. A. WILSON,
 H. R. ASH.